(12) United States Patent
Feng et al.

(10) Patent No.: US 12,490,718 B2
(45) Date of Patent: Dec. 9, 2025

(54) DOG TRAINING AND BARK CONTROL SYSTEM

(71) Applicant: Shenzhen SmartPet Technology Co., Ltd., Shenzhen (CN)

(72) Inventors: Wenjin Feng, Shenzhen (CN); Junyong Zhang, Shenzhen (CN)

(73) Assignee: Shenzhen SmartPet Technology Co., Ltd., PingshanDist (CN)

( * ) Notice: Subject to any disclaimer, the term of this patent is extended or adjusted under 35 U.S.C. 154(b) by 0 days.

(21) Appl. No.: 19/028,156

(22) Filed: Jan. 17, 2025

(65) Prior Publication Data

US 2025/0248368 A1 Aug. 7, 2025

Related U.S. Application Data

(63) Continuation-in-part of application No. 18/431,562, filed on Feb. 2, 2024, now Pat. No. 12,225,881.

(51) Int. Cl.
*A01K 15/02* (2006.01)
*A01K 29/00* (2006.01)

(52) U.S. Cl.
CPC .......... *A01K 15/022* (2013.01); *A01K 29/005* (2013.01)

(58) Field of Classification Search
CPC .... A01K 29/005; A01K 15/02; A01K 15/021; A01K 15/022
See application file for complete search history.

(56) References Cited

U.S. PATENT DOCUMENTS

| | | | | |
|---|---|---|---|---|
| 5,749,324 A | * | 5/1998 | Moore | A01K 27/009 119/718 |
| 10,834,897 B1 | * | 11/2020 | Chen | A01K 11/008 |
| 2007/0095303 A1 | * | 5/2007 | Lee, IV | A01K 15/022 119/718 |
| 2011/0061605 A1 | * | 3/2011 | Hardi | A01K 27/009 340/573.3 |
| 2016/0021506 A1 | * | 1/2016 | Bonge, Jr. | G16H 40/67 717/173 |
| 2017/0223928 A1 | * | 8/2017 | Davino | H04N 7/155 |
| 2018/0249680 A1 | * | 9/2018 | Van Curen | A01K 15/022 |
| 2020/0358629 A1 | * | 11/2020 | Panec | H04L 51/18 |
| 2020/0390063 A1 | * | 12/2020 | Li | A01K 27/009 |
| 2021/0219524 A1 | * | 7/2021 | So | H04R 1/08 |
| 2023/0380381 A1 | * | 11/2023 | Metcalfe | A01K 15/02 |

* cited by examiner

*Primary Examiner* — Joshua J Michener
*Assistant Examiner* — Aaron M Rodziwicz

(57) ABSTRACT

A dog training and bark control system includes a dog training and bark control device and a remote controller. The remote controller comprises a first control module, a sound acquisition module, and a first communication module, the sound acquisition module is used for acquiring sound data. the first control module is used for receiving the sound data transmitting the sound data; and the first control module is configured for sending a first control signal through the first communication module. The dog training and bark control device comprises a second control module, an audio playback module, a dog training and bark control module, and a second communication module. The second control module is configured for receiving sound data. The second control module is also configured for receiving a first control signal and for controlling the dog training and bark control module to provide a first dog training stimulus to a dog.

18 Claims, 8 Drawing Sheets

DOG TRAINING AND BARK CONTROL SYSTEM

CROSS REFERENCE TO RELATED APPLICATION

This application is a continuation in part of U.S. application Ser. No. 18/431,562, filed on Feb. 2, 2024, the content of which is incorporated by reference herein.

TECHNICAL FIELD

The present invention relates to a technical field of pet products, in particular to a dog training and bark control system.

BACKGROUND ART

With an increasing number of a pet dog and people's attention to the pet dog, a demand for pet dog care and management is also increasing. Among them, a dog training device is an electronic product that assists owners in correcting their pet dog's behavioral training to help them train their pet dog within a certain range. The dog training device generally includes a receiver and a remote control, the remote controller sends a signal driving instruction to the receiver, such as a sound signal, a vibration signal, or an electric shock signal, so that the receiver worn on the pet dog outputs sound, vibration, or electric shock, wait for stimulation to stimulate the pet dog, so as to remind the pet dog of its behavior and play the role of dog training.

However, the existing dog training devices are only used for dog training, only have a single function, can't allow users to realize the role of interaction with pet dogs, and can't meet the needs of users.

SUMMARY

A dog training and bark control system includes a dog training and bark control device and a remote controller. The remote controller comprises a first control module, a sound acquisition module, and a first communication module; both the sound acquisition module and the first communication module are electrically connected to the first control module, the sound acquisition module is used for acquiring sound data; the first control module is used for receiving the sound data acquired by the sound acquisition module and wirelessly transmitting the sound data through the first communication module; and the first control module is configured for sending a first control signal through the first communication module.

The dog training and bark control device comprises a second control module, an audio playback module, a dog training and bark control module, and a second communication module; the audio playback module, the dog training and bark control module, and the second communication module are electrically connected to the second control module; the second communication module communicates with the first communication module; the second control module is configured for receiving sound data sent by the first communication module through the second communication module, and configured for playing the sound data through the audio playback module; the second control module is also configured for receiving the sound data sent by the first communication module through the second communication module, the second control module is also configured for receiving a first control signal sent by the first communication module through the second communication module, and for controlling the dog training and bark control module to provide a first dog training stimulus to a dog.

Furthermore, the dog training and bark control device further comprises a sound sensing unit electrically connected to the second control module, the sound sensing unit being used to collect sound signals from a target dog; the second control module is configured for receiving the sound signal of the dog collected by the sound sensing unit, and analyzing number of times of barks of the target dog within a preset time range and/or analyzing a barking state of the target dog based on the sound signal in order to obtain state data of the target dog, and for feeding back of the state data to the user.

Furthermore, the second control module is configured for analyzing a number of times the target dog barks within the preset time range, and determining whether the number of times the barks is within the preset number of times within the preset time range; and, if not, the second control module obtains abnormal status data as the status data of the target dog, then feeds the abnormal status data back to the user.

Furthermore, the preset time range is greater than or equal to one day.

Furthermore, the second control module is preset with a barking template; the second control module is configured for matching the sound signal with the barking template, and when the second control module judges the sound signal to be a barking state corresponding to the barking template, then obtaining a preset barking state corresponding to the barking template as the status data and feeding the status data back to the user; the barking template comprising a template representing at least one of the states of fear, hunger, alertness, anger, aggrieved, sadness, sickness, and excitement.

Furthermore, the dog training and bark control device further comprises an alarm module, the alarm module being electrically connected to the second control module; the second control module is further used to feed back to the user in the event that the number of barking sounds as well as the barking state are abnormal and drive the alarm module to alarm.

Furthermore, the alarm module is at least one of a sound alarm module, a vibration alarm module, and a light alarm module.

Furthermore, the dog training and bark control device further comprises a vibration sensing unit, the vibration sensing unit being used to detect and obtain a motion signal of the target dog; the second control module, being further used to receive the sound signal and the motion signal of the target dog, and to judge whether the sound signal is a sound signal of the target dog based on the motion signal of the target dog; if a judgement result is "yes", the second control module is used for analyzing the sound signal.

Furthermore, the dog training and bark control device further comprises a physiological parameter sensing unit electrically connected to the second control module, the physiological parameter sensing unit being used to detect a physiological parameter of the target dog, the physiological parameter comprising at least one of a body temperature, a heart rate, a blood pressure, a sleep time, a number of steps of exercise, and an energy consumption of exercise.

Furthermore, the second control module is further used to obtain the physiological parameters of the target dog via the physiological parameter sensing unit and transmit the physiological parameters to the remote controller via the second communication module.

Furthermore, wherein the dog training and bark control device further comprises a first temperature sensor electrically connected to the second control module, the first temperature sensor being used for detecting the body temperature of the target dog.

Furthermore, wherein the dog training and bark control device further comprises a second temperature sensor electrically connected to the second control module, the second temperature sensor being used for detecting an ambient temperature, and the second control module being used for receiving the ambient temperature detected by the second temperature sensor and transmitting the ambient temperature to the remote controller via the second communication module.

Furthermore, wherein the dog training and bark control device further comprises a distance sensing unit electrically connected to the second control module, the distance sensing unit being used for detecting position information of the dog training and bark control device; the second control module being used for receiving the position information detected by the distance sensing unit and transmitting the position information back to the remote controller via the second communication module.

Furthermore, wherein the dog training and bark control device further comprises a distance sensing unit electrically connected to the second control module, the distance sensing unit being used for detecting a distance between the dog training and bark control device and the remote controller; the second control module being used for receiving the distance information fed back from the distance sensing unit and sending a reminder signal to the remote controller when the distance information exceeds a predetermined distance.

Furthermore, wherein the dog training and bark control device further comprises a first operation button electrically connected to the second control module, the second control module also collects a first audio data of the user through the sound sensing unit when the user operates the first operation button and stores the first audio data, the first control module also sends an interactive control signal through the first communication module, the second control module receives an interactive control signal using the second communication module, retrieves the first audio data and plays the first audio data through an audio player.

Furthermore, the first audio data comprises a plurality sets of first audio data, the interactive control signal comprises a plurality sets of control signals, and each interactive control signal corresponds to a set of first audio data.

Furthermore, the remote controller further comprises a second operation button and a third operation button electrically connected to the first control module, the first control module capturing a second audio data of the user through a sound acquisition module when the user operates the second operation button and storing the second audio data, and the first control module further captures the user's second audio data by retrieving the second audio data when the user operates the third operation button and sending the second audio data through the first communication module; the second control module receives the second audio data using the second communication module and plays the second audio data through an audio player.

Furthermore, the second audio data comprises a plurality sets of second audio data, a total number of the third operation buttons is plural, and each of the third operation buttons corresponds to a set of the second audio data.

Furthermore, the dog training and bark control device further comprises a sensing module electrically connected to the second control module and used for detecting barking of a dog for obtaining a detection signal, the dog training and bark control device having a dog training mode, a bark control mode and a dog training and bark control mode; in the dog training mode, the second control module passes a first control signal in order to control the stop bark training module to provide a first dog training stimulus to the dog; in the bark control mode, the second control module for controlling the dog training stop-bark module to provide a first bark control stimulus to a dog based on the detected signal; in the dog training and bark control mode, the second control module for receiving a second control signal from the remote controller via the first communication module for controlling the dog training and bark control module to provide a second dog training stimulus to the dog, and for controlling the dog training and bark control module to provide a second bark control stimulus to the dog in accordance with the detected signal.

Furthermore, the dog training and bark control module comprises a sound unit for dog training and bark control, an electrical stimulus unit for dog training and bark control, a vibration unit for dog training and bark control, and an ultrasonic unit for dog training and bark control; at least one of the first bark control stimulus, the second bark control stimulus, the first dog training stimulus, and the second dog training stimulus has a first level and a second level; wherein at the first level, at least one of the first bark control stimulus, the second bark control stimulus, the first dog training stimulus and the second dog training stimulus comprises a sound stimulus and a vibration stimulus; wherein at the second level, at least one of the first bark control stimulus, the second bark control stimulus, the first dog training stimulus and the second dog training stimulus comprises a sound stimulus, a vibration stimulus, and an electrical stimulus.

The present invention has the following beneficial effects: compared with prior art, the present invention can be used by speaking to the remote control in real time in order to allow the sound data collected by the sound acquisition module, then the sound data is sent by the first communication module through the second communication module, the dog training and bark control device receives the sound data sent by the first communication module through the second communication module, and plays the sound data through the second control module and the audio playback module, thereby realizing the user to interact with the target dog in real time, to solve the problem that the existing dog training device only applies to dog training, resulting in a single functionality, and to improve the functionality of the product.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
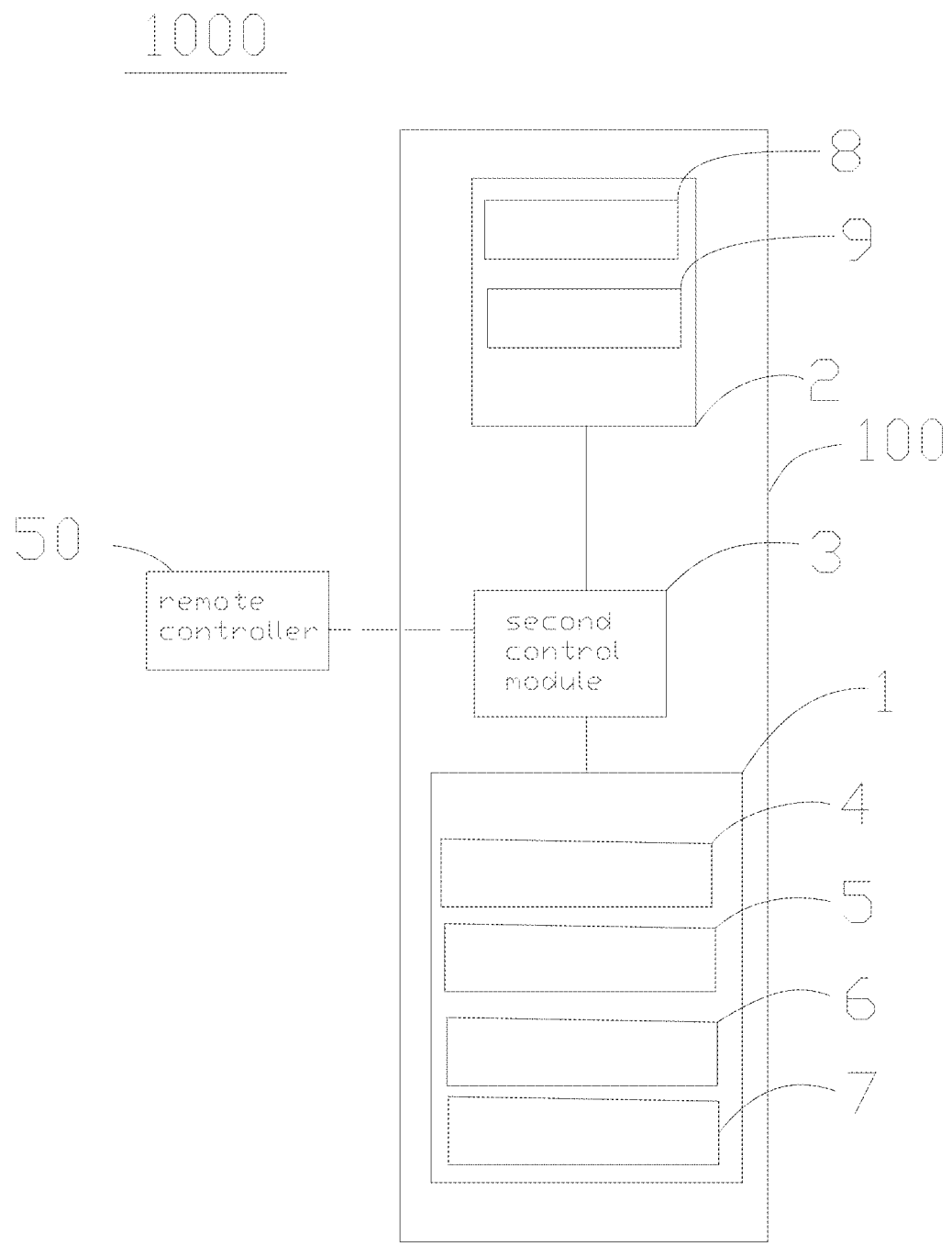
FIG. 1 is a principle block diagram according to an embodiment of the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the said features. In the description of embodiments of the application, "a plurality of" means two or more, unless otherwise specifically defined.

Figure 2:
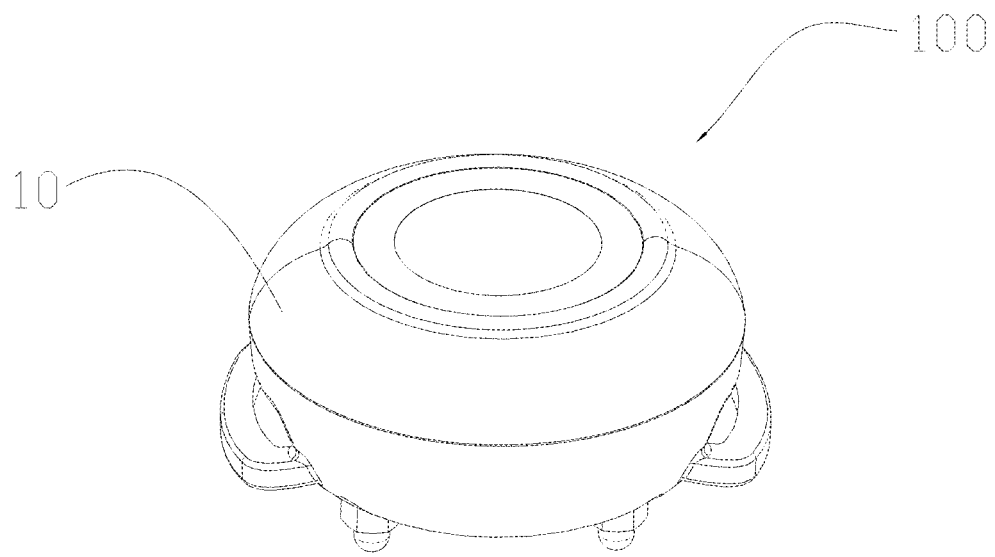
FIG. 2 is a schematic diagram of a structure of a dog training and bark control device according to the present invention.
Figure 3:
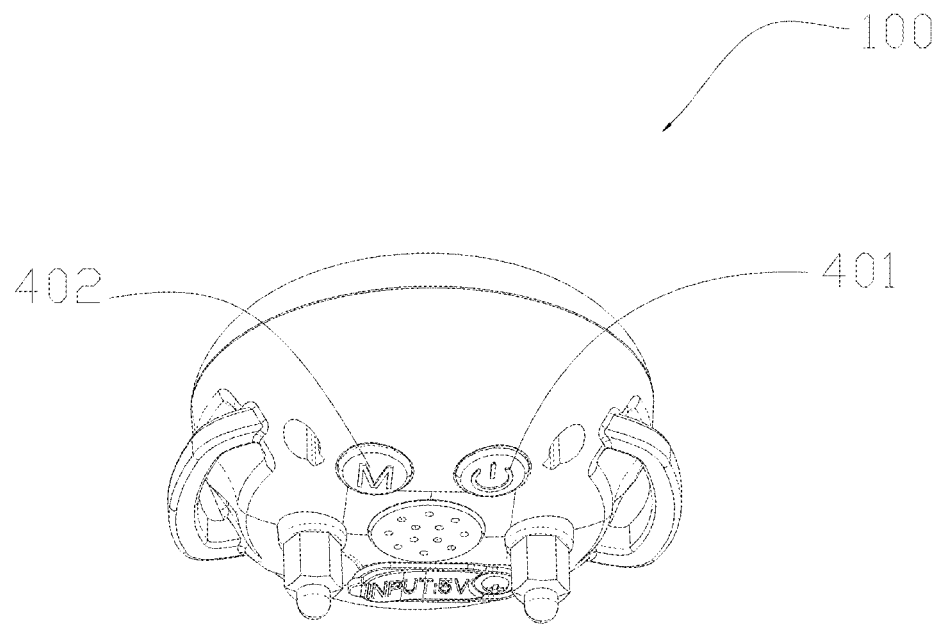
FIG. 3 is a schematic diagram of a structure of a dog training and bark control device from another perspective according to the present invention.
Figure 4:
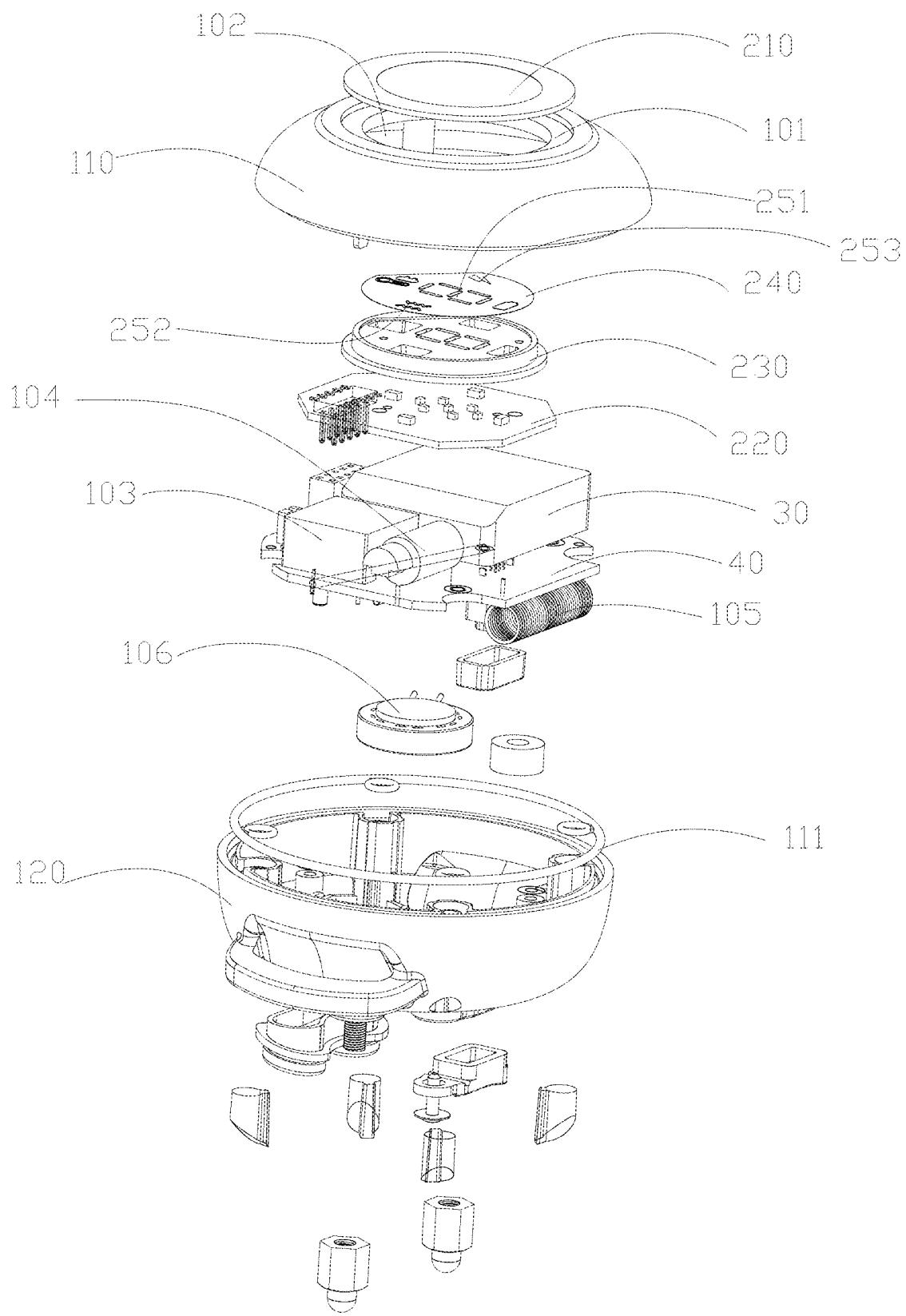
FIG. 4 is an exploded view of a dog training and bark control device according to the present invention.
Figure 5:
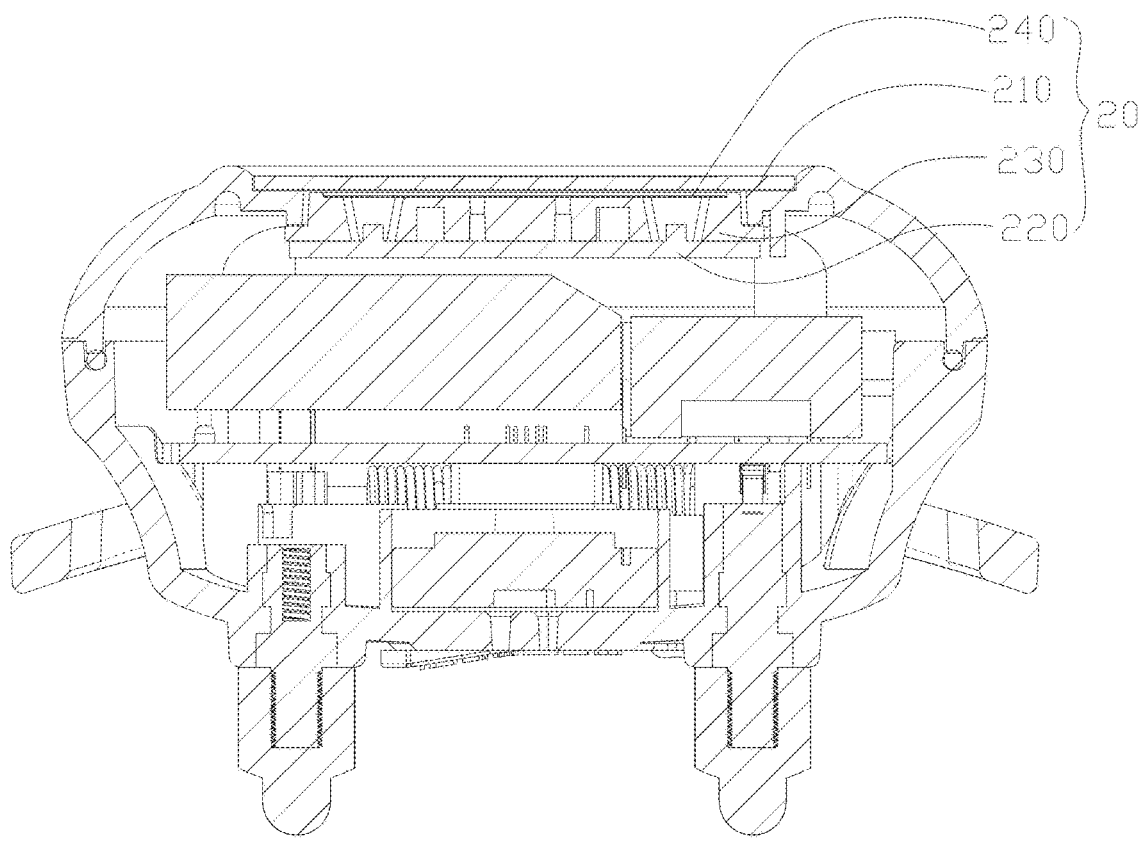
FIG. 5 is a sectional view of a dog training and bark control device according to the present invention.
Figure 6:
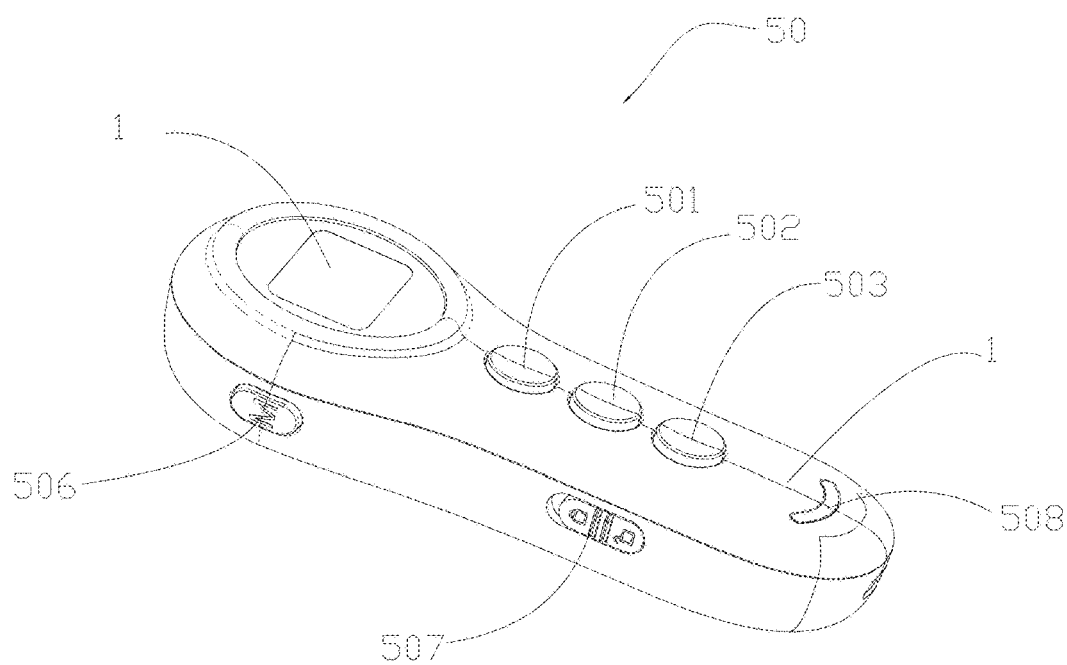
FIG. 6 is a schematic diagram of a structure of a remote controller according to the present invention.
Figure 7:
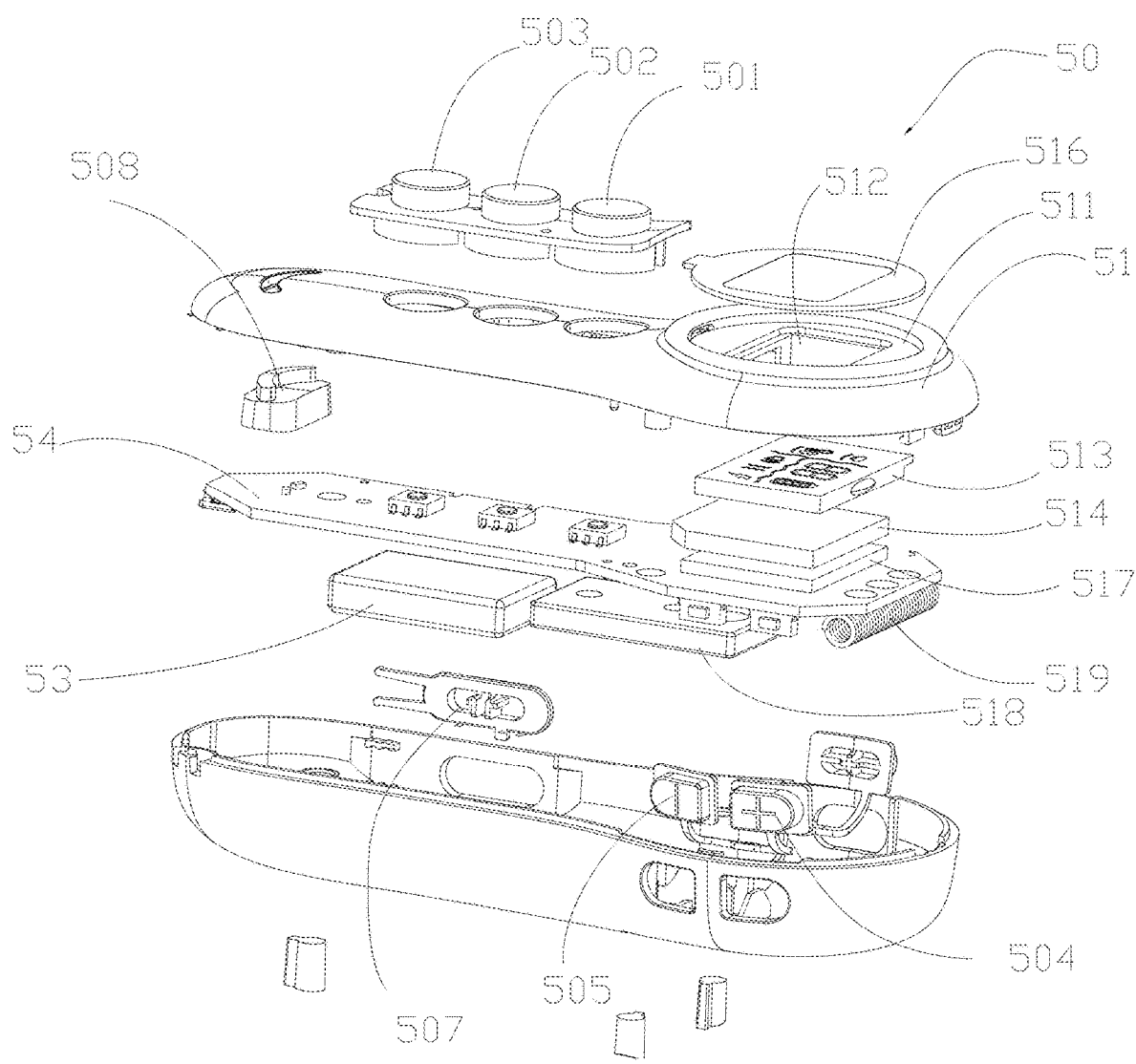
FIG. 7 is an exploded view of a remote controller according to the present invention.
Figure 8:
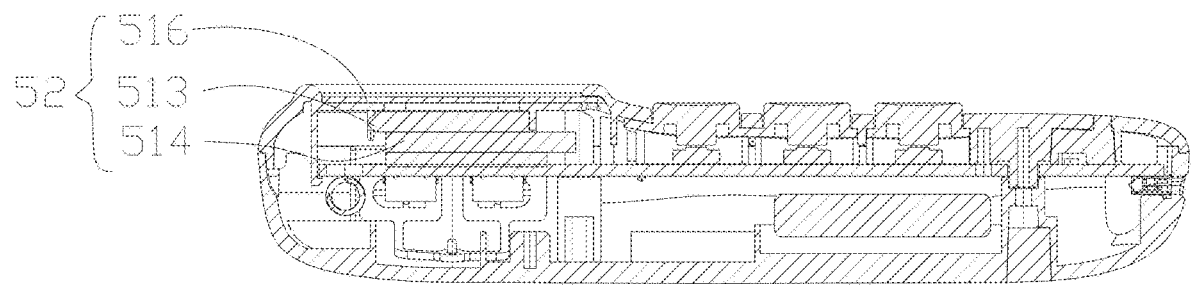
FIG. 8 is a sectional view of a remote controller according to the present invention.
Figure 9:
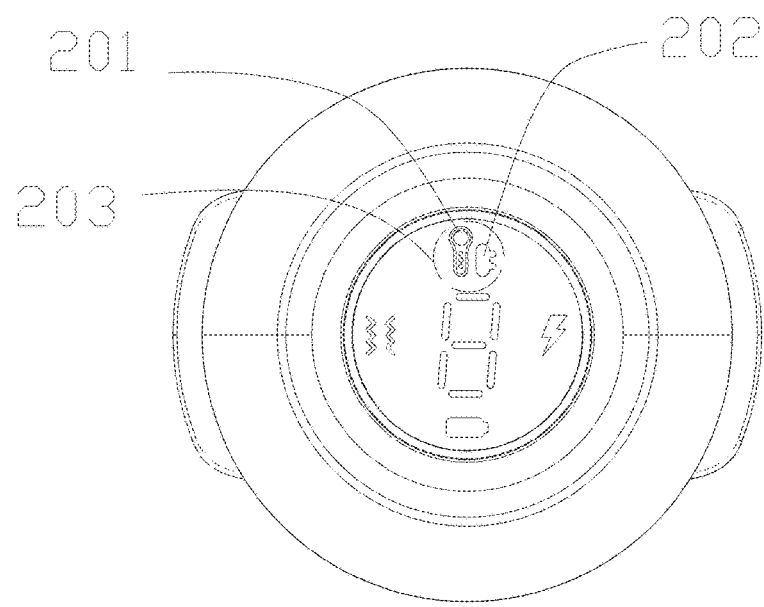
FIG. 9 is a schematic diagram of a structure of a dog training and bark control device viewed from another angle according to the present invention.
Figure 10:
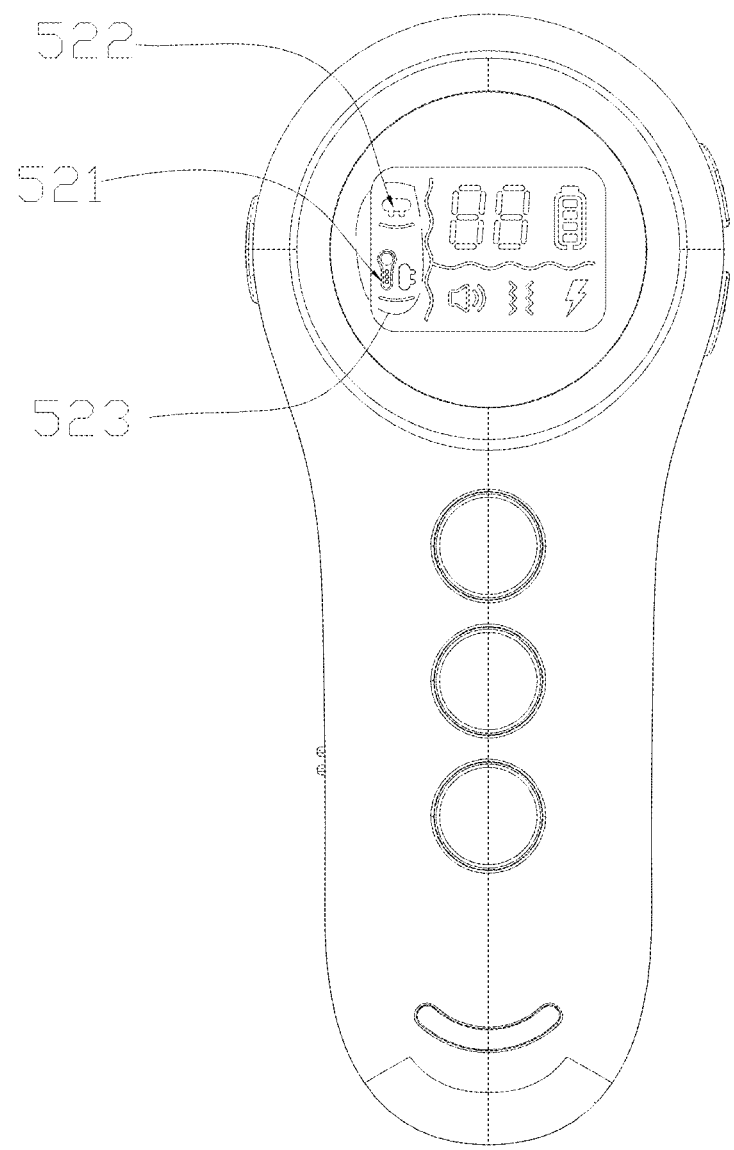
FIG. 10 is a schematic diagram of a structure of a remote controller viewed from another angle according to the present invention.
Figure 11:
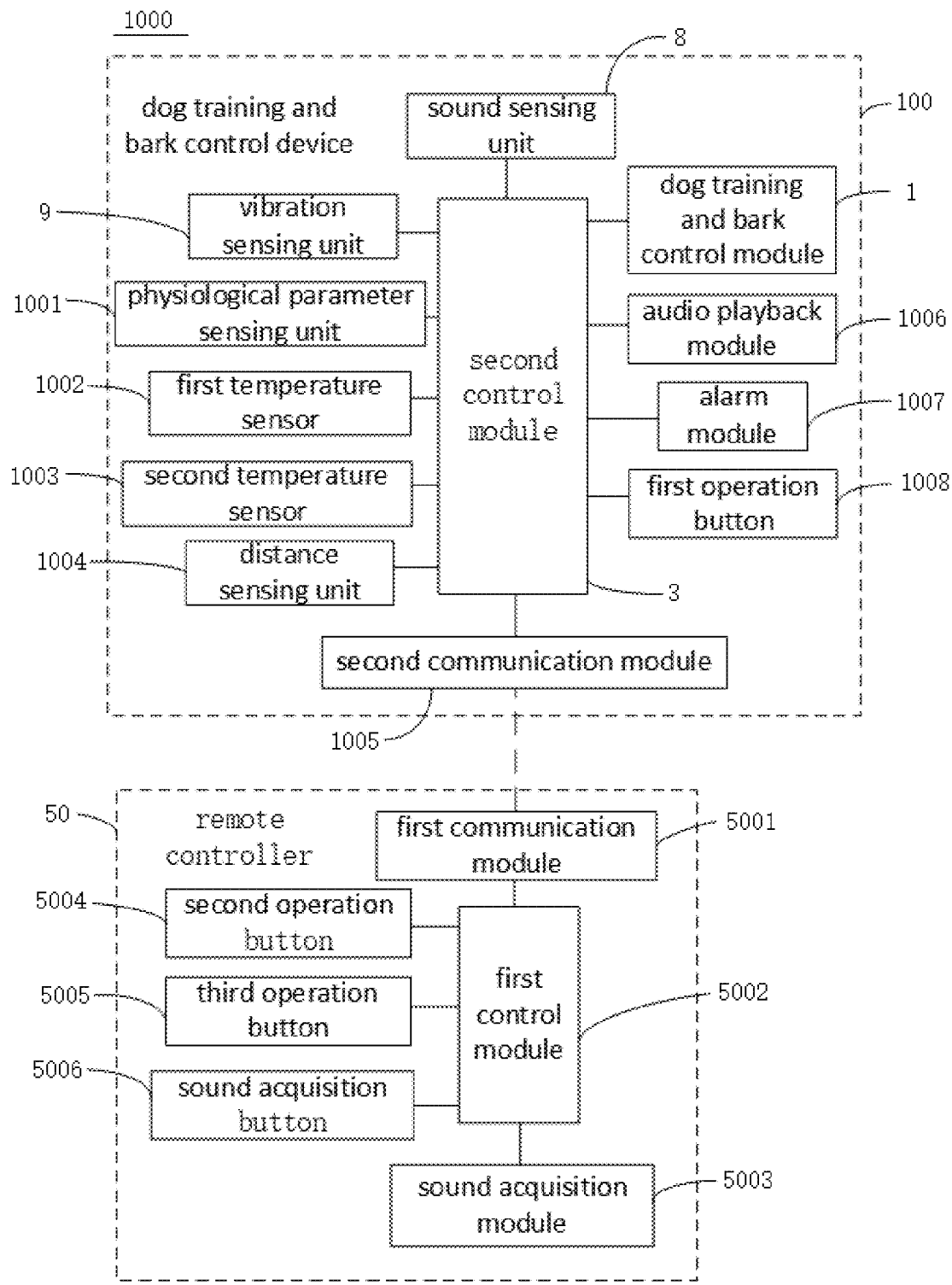
FIG. 11 is a more detailed block diagram of FIG. 1 according to the present invention.

Referring to FIGS. 1-11, a dog training and bark control device 100 includes a dog training and bark control module 1, a sensing module 2 configured for detecting dog barking to obtain a detection signal, and a second control module 3 electrically connected to the sensing module 2 and the dog training and bark control module 1. The dog training and bark control device 100 has a dog training mode, a bark control mode and a dog training and bark control mode.

In the dog training mode, the second control module 3 is used for receiving a first control signal from an external remote controller 50 to control the dog training and bark control module 1 to provide a dog with a first dog training stimulus. At this time, the second control module 3 only receives the first control signal from the external remote controller 50 and stops receiving the detection signal from the sensing module 2. Specifically, the second control module 3 only receives an instruction from the remote controller to perform a dog training function and turns off a bark control function for the dog.

In the bark control mode, the second control module 3 is used for controlling the dog training and bark control module 1 to provide a first bark control stimulus to the dog based on the detection signal. At this time, the second control module 3 only receives the detection signal from the sensing module 2 and stops receiving the first control signal from the external remote controller 50. Specifically, the second control module 3 only triggers the bark control function through a bark of the dog and stops receiving signals from the remote controller 50.

In the dog training and bark control mode, the second control module 3 is used for receiving the control signal from the remote controller 50 to control the dog training and bark control module 1 to provide a second dog training stimulus to the dog, and for controlling the dog training and bark control module 1 to provide a second bark control stimulus to the dog based on the detection signal. At this time, the second control module 3 can receive the first control signal from the external remote controller 50 and also receive the detection signal from the sensing module 2. Specifically, based on an order in which the second control module 3 receives signals, a corresponding dog training function or a corresponding bark control function is performed on the dog in sequence. For example, when the second control module 3 first receives the detection signal from the sensing module 2 and performs the bark control function, if the remote controller 50 sends the first control signal at this time, the second control module 3 will stop receiving the detection signal and execute the dog training function.

Through the above structure, the dog training and bark control device 100 can be effectively switched between three modes: the dog training mode, the bark control mode, and the dog training and bark control mode. This allows a user to choose an appropriate mode of the dog training and bark control device 100 according to an actual need of a pet dog in different situations, so as to more flexibly respond to different training and behavior management needs, helping the user better interact with the pet, promoting the pet's healthy growth, and improving product satisfaction.

Furthermore, in the dog training and bark control mode, when the second control module 3 receives the control signal from the remote controller 50, the second control module 3 stops receiving the detection signal or strops executing an instruction of controlling the dog training and bark control module 1 to provide the second bark control stimulus to the dog based on the detection signal, and controls the dog training and bark control module 1 to provide the second dog training stimulus to the dog based on the control signal. Through the above structure, when the remote controller 50 is used for controlling the dog training and bark control device 100, the detection signal from the sensing module 2 can be prevented from interfering with the second control module 3, effectively realizing the control of the remote controller 50 on the dog training and bark control device 100, thereby providing the second dog training stimulus to the dog and achieving a goal of dog training and bark control for a target dog.

In one embodiment, the dog training and bark control module 1 includes at least one of a sound unit for dog training and bark control 4, an electrical stimulus unit for dog training and bark control 5, a vibration unit for dog training and bark control 6, and an ultrasonic unit for dog training and bark control 7. Through the above structure, the dog training and bark control module 1 can realize an intervention or a treatment from the dog training and bark control device 100 to the dog through any one method of sound, current, vibration, and ultrasound. Any one of these methods can effectively train or soothe the dog, thereby better managing the dog's emotions or health.

In this embodiment, the dog training and bark control module 1 includes the sound unit for dog training and bark control 4, the electrical stimulus unit for dog training and bark control 5, and the vibration unit for dog training and bark control 6. At least one of the first bark control stimulus, the second bark control stimulus, the first dog training stimulus, and the second dog training stimulus has a first level and a second level. At the first level, at least one of the first bark control stimulus, the second bark control stimulus, the first dog training stimulus and the second dog training stimulus includes a sound stimulus and a vibration stimulus. At the second level, at least one of the first bark control stimulus, the second bark control stimulus, the first dog training stimulus, and the second dog training stimulus includes a sound stimulus, a vibration stimulus, and an electrical stimulus. Through the above structure, the dog training and bark control module 1 can realize the intervention or the treatment from the dog training and bark control device 100 to the dog through three methods: sound, current, and vibration. Moreover, since at least one of the first bark control stimulus, the second bark control stimulus, the first dog training stimulus and the second dog training stimulus has two different levels, when the user is training the dog and controlling the bark of the dog according to specific actual situations, the dog training and bark control module 1 can be used for stimulating the dog at different levels and in different ways, thereby the dog training and bark control device 100 can more effectively train and soothe the dog, so as to better manage the dog's emotions or health and improve user experience.

In this embodiment, the sensing module 2 includes a sound sensing unit 8 for detecting dog barking to obtain a sound signal, and the detection signal includes the sound signal. And the sensing module 2 includes a vibration sensing unit 9 for detecting a motion of a dog barking to obtain a motion signal, and the detection signal includes the motion signal. The second control module 3 is also used for controlling whether the dog training and bark control module 1 provides the dog with the first bark control stimulus or the second bark control stimulus or not based on the sound signal and the motion signal. Through the above structure, combined with the sound sensing unit 8 and the vibration sensing unit 9, the sensing module 2 can more comprehensively detect a behavior of the target dog, allowing the second control module 3 to more accurately judge a state of the pet dog to choose whether to provide the first bark control stimulus or the second bark control stimulus or not, thereby more intelligently controlling the bark control stimulus and reducing a possibility of misjudgment. This design makes the dog training and bark control device more intelligent and flexible, and can more accurately meet a training and bark control need of the pet dog, providing the user with a better user experience.

In this embodiment, the dog training and bark control device 100 further includes a first housing 10, a first display module 20, a first battery 30, and a first circuit board 40. The first display module 20 is installed on the first housing 10. The first battery 30 and the first circuit board 40 are set in the first housing 10 and electrically connected to each other. The second control module 3 is set on the first circuit board 40 and electrically connected to the first display module 20. The first display module 20 is used for displaying an electric quantity of the first battery 30, a charging state of the first battery 30, a first icon 201 representing the dog training mode, a second icon 202 representing the bark control mode, and a third icon 203 representing the dog training and bark control mode. There are no special restrictions on an icon style corresponding to the first icon 201, the second icon 202, and the third icon 203. Through the above structure, the first display module 20 is electrically connected to the second control module 3 and installed on the first housing 10. The user can easily observe and see an icon of a corresponding mode, thereby the user can intuitively understand a current mode information of the dog training and bark control device 100, which is convenient for the user to use, solving a problem of inconvenience for the user to perceive and affecting user experience when using different modes of dog training and bark control.

Specifically, a first groove 101 is provided on an outer side surface of the first housing 10. A first window 102 is provided on the first groove 101, and the first window 102 is in communication with an interior of the first housing 10. The display module is located inside the first housing 10 and at least partially placed inside the first window 102.

Furthermore, the first display module 20 includes a first lens 210 placed inside the first groove 101 and pasted on a bottom surface of the first groove 101 with waterproof adhesive, and a second circuit board 220, a light guide plate 230, and a pattern substrate 240 placed inside the first housing 10. The light guide plate 230 is at least partially placed inside the first window 102. The pattern substrate 240 is pasted on a side of the light guide plate 230 near the first groove 101. The second circuit board 220 is located on a side of the light guide plate 230 away from the first groove 101.

Furthermore, the pattern substrate 240 is equipped with a light transmitting pattern 250 for transmitting light. The light guide plate 230 is provided with a through hole 260 at a corresponding position of the light transmitting pattern 250. The second circuit board 220 is equipped with a light source component 270 at a corresponding position of the through hole 260. A light from the light source component 270 passes through the through hole 260 and the light transmitting pattern 250 in sequence, and then the light transmitting pattern 250 is projected out from the first lens 210.

Specifically, the first lens 210 can be an LED display screen, and the light transmitting pattern 250 includes a digital pattern 251 in a shape of an "8" for displaying a sound gear, a vibration icon 252 for displaying a vibration gear, and an electric shock icon 253 for displaying an electric shock gear. Through the above structure, the dog training and barking stop device 100 can effectively display a clear and accurate mode, making it easy for a customer to observe and use the dog training and bark control device to train or comfort the dog.

In this embodiment, the first housing 10 is also equipped with a transformer 103, a motor 104, an antenna 105, and a horn 106. The first housing 10 includes a first upper housing 110 and a first lower housing 120, and a waterproof ring 111 is also provided between the first upper housing 110 and the first lower housing 120. The first housing 10 is also equipped with a power button 401 connected to the first circuit board 40 and a first "M" button 402. The power button 401 is used for turning on or turning off the dog training and bark control device 100, and the first "M" button 402 is used for switching modes.

In this embodiment, the second control module 3 is also used for analyze a total number of barks of a target dog within a preset time range and/or analyzing a barking state of the target dog based on the detection signal to obtain a state data of the target dog and control a feedback of the state data to the user. Through the above structure, the dog training and bark control device 100 effectively receives the sound signal emitted by the bark of the dog and analyzes the total number of barks of the target dog within the preset time range and/or analyzes the barking state of the target dog to obtain the state data of the target dog, and controls the feedback of the state data to the user, so that the user can know a current state of the target dog based on the state data from the respective feedback of three modes: the dog training mode, the bark control mode, and the dog training and bark control mode, and the user can consider whether the intervention or the treatment such as sick care, emotional comfort, etc. is needed or not based on the current state of the target dog, which plays an important role in ensuring a healthy breeding of the pet dog.

In this embodiment, the second control module 3 analyzes the barking state of the target dog. If the sound signal matches a preset barking template, the second control module 3 determines that the sound signal is a corresponding barking state of the preset barking template, and the second control module 3 obtains the barking state corresponding to the preset barking template as the state data and controls the feedback of the state data to the user. The preset barking template includes a barking template representing at least one state of fear, hunger, alertness, anger, grievance, sadness, illness, and excitement. Through the above structure, analyzing the barking state can help the user monitor a health state of the dog, strengthen interaction between the user and the pet, and improve user experience. And due to the preset barking template, an effective way is provided for the second control module 3 to recognize and understand the sound signal of the target dog, thereby more effectively monitoring the pet's emotions and health state.

Referring to FIGS. 1-11, a dog training and bark control system 1000 is also provided.

The dog training and bark control device 100 includes a dog training and bark control module 1, a sensing module 2 for detecting dog barking to obtain a detection signal, and a second control module 3. The second control module 3 is electrically connected to the sensing module 2 and the dog training and bark control module 1. The dog training and bark control device 100 has a dog training mode, a bark control mode, and a dog training and bark control mode. The remote controller 50 is connected to the dog training and bark control device 100 for communication.

In the dog training mode, the second control module 3 is used for receiving a first control signal from the remote controller 50 to control the dog training and bark control module 1 to provide a dog with a first dog training stimulus. At this time, the second control module 3 only receives the first control signal from the external remote controller 50 and stops receiving the detection signal from the sensing module 2. Specifically, the second control module 3 only receives an instruction from the remote controller to execute a dog training function and turns off a bark control function for the dog.

In the bark control mode, the second control module 3 is used for controlling the dog training and bark control module 1 to provide a first bark control stimulus to the dog based on the detection signal. At this time, the second control module 3 only receives the detection signal from the sensing module 2 and stops receiving the first control signal from the external remote controller 50. Specifically, only the bark control function is triggered through the barking of the dog and stops receiving the signal from the remote controller 50.

In the dog training and bark control mode, the second control module 3 is used for receiving the control signal from the remote controller 50 to control the dog training and bark control module 1 to provide a second dog training stimulus to the dog, and for controlling the dog training and bark control module 1 to provide a second bark control stimulus to the dog based on the detection signal. At this time, the second control module 3 can receive the first control signal from the external remote controller 50 and also receive the detection signal from the sensing module 2. Specifically, based on an order in which the second control module 3 receives signals, a corresponding dog training function or a corresponding bark control function is performed on the dog in sequence. For example, when the second control module 3 first receives the detection signal from the sensing module 2 and performs the bark control function, if the remote controller 50 sends the first control signal at this time, the second control module 3 will stop receiving the detection signal and execute the dog training function.

Through the above structure, the dog training and bark control device 100 can be effectively switched among three modes: the dog training mode, the bark control mode, and the dog training and bark control mode, allowing the user to select an appropriate mode of the dog training and bark control device 100 according to an actual need of the pet dog in different situations, thereby more flexibly responding to different training and behavior management needs, helping the user better interact with the pet, promoting the pet's healthy growth, and improving product satisfaction.

In this embodiment, in the dog training and bark control mode, when the second control module 3 receives the control signal from the remote controller 50, the second control module 3 stops receiving the detection signal or stops executing an instruction of controlling the dog training and bark control module 1 to provide the second bark control stimulus to the dog based on the detection signal, and controls the dog training and bark control module 1 to provide the second dog training stimulus to the dog based on the control signal. Through the above structure, when the remote controller 50 is used for controlling the dog training and bark control device 100, the detection signal from the sensing module 2 can be prevented from interfering with the second control module 3, effectively realizing the control of the remote controller 50 on the dog training and bark control 100, thereby providing the second dog training stimulus to the dog and achieving the goal of dog training and bark control for the target dog.

In this embodiment, the dog training and bark control module 1 includes at least one of a sound unit for dog training and bark control 4, an electrical stimulus unit for dog training and bark control 5, a vibration unit for dog training and bark control 6, and an ultrasonic unit for dog training and bark control 7. Through the above structure, the dog training and bark control module 1 can realize the intervention or the treatment from the dog training and bark control device 10 to the dog through any one method of sound, current, vibration, and ultrasound. Any one of these methods can effectively train or soothe the dog, thereby better managing the dog's emotions or health.

In this embodiment, the dog training and bark control module 1 includes the sound unit for dog training and bark control 4, the electrical stimulus unit for dog training and bark control 5, and the vibration unit for dog training and bark control 6. At least one of the first bark control stimulus, the second bark control stimulus, the first dog training stimulus, and the second dog training stimulus has a first level and a second level. At the first level, at least one of the first bark control stimulus, the second bark control stimulus, the first dog training stimulus and the second dog training stimulus includes a sound stimulus and a vibration stimulus. At the second level, at least one of the first bark control stimulus, the second bark control stimulus, the first dog training stimulus, and the second dog training stimulus includes a sound stimulus, a vibration stimulus, and an electrical stimulus. Through the above structure, the dog training and bark control module 1 can realize the intervention or the treatment from the dog training and bark control device 100 to the dog through three methods: sound, current, and vibration. Moreover, since at least one of the first bark control stimulus, the second bark control stimulus, the first dog training stimulus, and the second dog training stimulus has two different levels, when the user is training the dog and controlling a bark of the dog according to specific actual situations, the user can use the dog training and bark control module 1 to stimulate the dog at different levels and in different ways, so that the dog training and bark control 100 can more effectively train or soothe the dog, thereby better managing the dog's emotions or health and improving user experience.

Specifically, the remote controller 50 includes a first control module 5002, and a sound acquisition module 5003, and a first communication module 5001. The sound acquisition module 5003 is electrically connected to the first control module 5002, and is used to acquire sound data. The first communication module 5001 is electrically connected to the first control module 5002. The first control module 5001 is used to receive the sound data collected by the sound acquisition module 5003, and transmit the sound data wirelessly through the first communication module 5001. The first control module 5002 sends a first control signal through the first communication module 5002.

The dog training and bark control device 100 includes an audio playback module 1006 electrically connected to the second control module 3, a second communication module 1005. The second communication module 1005 communicates with the first communication module 5001. The second control module 3 receives sound data sent by the first communication module 5001 via the second communication module 1005 and plays the sound data via the audio playback module 1006. The second control module 3 also receives, via the second communication module 1005, a first control signal sent by the first communication module 5001 to control the dog training and bark control module 1 to provide a first dog training stimulus to the dog.

Through the above-described settings, when the user needs to interact with the target dog, the user may speak in real time through the remote controller 50 to allow the sound data collected by the sound acquisition module 5003 to be sent through the first communication module 5001 via the first control module 5002. The dog training and bark control device 100 receives the sound data sent by the first communication module 5001 through the second communication module 1005 and plays it through the second control module 3 and the audio playback module 1006, thereby realizing real-time interaction between the user and the target dog and solving the problem that the existing dog trainer is only applicable to dog training resulting in a single functionality, so as to improve the functionality of the product. Through the sound acquisition module 5003 real-time sound acquisition, the sound data can be diversified, which greatly satisfies the user's need to give the target dog diverse commands.

In an embodiment, the remote controller 50 is provided with a sound acquisition button 5006 electrically connected to the first control module 5002 and available for use by the user, and the first control module 5002 collects user sound data in real time through the sound acquisition module 5003 when the user operates the sound acquisition button 5006 for use by the user.

In this embodiment, the sensing module 2 includes a sound sensing unit 8 for detecting dog barking to obtain a sound signal, and the detection signal includes the sound signal. The sensing module 2 includes a vibration sensing unit 9 for detecting a motion of a dog to obtain a motion signal, and the detection signal includes the motion signal. The second control module 3 is also used for controlling whether the dog training and bark control module 1 provides the dog with a first bark control stimulus or a second bark control stimulus or not based on the sound signal and the motion signal. Through the above structure, combined with the sound sensing unit 8 and the vibration sensing unit 9, the sensing module 2 can more comprehensively detect a behavior of the target dog, allowing the second control module 3 to more accurately determine a state of the pet dog to choose whether to provide the first bark control stimulus or the second bark control stimulus or not, thereby more intelligently controlling the bark control stimulus and reducing a possibility of misjudgment. This design makes the dog training and bark control device more intelligent and flexible, and can more accurately meet dog training and bark control needs of the pet dog, providing the user with a better user experience.

In this embodiment, the second control module 3 is also used for analyzing a total number of barks of a target dog within a preset time range and/or analyzing a barking state of the target dog based on the sound signal to obtain a state data of the target dog, and control a feedback of the state data to the user. Specifically, the feedback to the user may be understood as feeding the status data to the remote controller 50 via the second communication module 1005, and the user may understand the status of the target dog according to the remote controller 50; alternatively, the feedback to the user may be understood as uploading the status data to the cloud (storage) via the second communication module 1005, and the user may understand the status of the target dog according to the cell phone or the monitoring platform. Alternatively, the feedback to the user may also be understood as feeding the status data back to the remote controller 50 via the second communication module 1005, the remote controller 50 uploading the status data to the cloud (storage) via the second communication module 1005, so that the user can understand the status of the target dog based on the cell phone or the monitoring platform. Through the above structure, the dog training and bark control device 100 effectively receives the sound signal emitted by the dog's barking and analyzes the total number of barks of the target dog within the preset time range and/or analyzes the barking state of the target dog to obtain the state data of the target dog, and controls the feedback of the state data to the user, so that the user can know a current state of the target dog based on the state data from the respective feedback of three modes: the dog training mode, the bark control mode and the dog training and bark control mode, and can consider whether the intervention or the treatment from the user such as sick care, emotional comfort, etc. is needed based on the current state of the target dog, which plays an important role in ensuring a healthy breeding of the pet dog.

In one embodiment, the second control module 3 is used to analyze the number of barking times of the target dog within a preset time range, and determine whether the number of barking times is within the preset number of times within the preset time range, and if not, the second control module 3 obtains the abnormal status data as the status data of the target dog, then the abnormal status data is fed back to the user. The preset time may be a certain period of time in a day, a day, a week or a month, etc., and the status data is the barking status of the target dog or the data on the number of times the target dog barks in a certain period of time in a day, a day, a week or a month, according to the number of times the target dog barks so that the user can train the target dog better according to these data and reduce the adverse effects of pet on the people in the vicinity. The user can intervene in time when the status data of the target dog is abnormal.

In this embodiment, the second control module 3 analyzes the barking state of the target dog. If the sound signal matches a preset barking template, the second control module 3 determines that the sound signal is a corresponding barking state of the preset barking template, and the second control module 3 obtains the barking state corresponding to the preset barking template as the state data and controls the feedback of the state data to the user. The preset barking template includes a barking template representing at least one state of fear, hunger, alertness, anger, grievance, sadness, illness, and excitement. Through the above structure, analyzing the barking state can help the user monitor a health state of the dog, strengthen interaction between the user and the pet, and improve user experience. And due to the preset barking template, an effective way is provided for the second control module 3 to recognize and understand the sound signal of the target dog, thereby more effectively monitoring the pet's emotions and health state.

In one embodiment, the dog training and bark control device 100 further includes an alarm module 1007, which is electrically connected to a second control module 3. The second control module 3 is also used to provide feedback to the user when the number of barking sounds as well as the barking status is abnormal, and to drive the alarm module 1007 to alarm. In this way, the dog training and bark control device 100 can alert the user or a nearby person in order to deal with the target dog in a timely manner in case of abnormality and prevent accidents. Specifically, the alarm module 1007 may be a sound alarm module, a vibration alarm module, a light alarm module, and the like.

In one embodiment, the dog training and bark control device 100 further includes a vibration sensing unit 9, and the vibration sensing unit 9 is used to detect and obtain a motion signal of the target dog. The second control module 3, is also used to receive the sound signal and the motion signal of the target dog, and to determine whether the sound signal is the sound signal of the target dog based on the motion signal of the target dog, and to analyze the sound signal if the judgment result is yes. The vibration sensing unit 9 may be an acceleration sensor, a gyroscope, a motion sensor, and the like. When the dog training and bark control device 100 is worn on the neck of the target dog, the vibration sensing unit 9 is affixed to the prominentia laryngea position of the target dog, and when the target dog barks, the vibration sensing unit 9 detects the movement of the prominentia laryngea of the target dog, and thus feeds the movement signal to the second control module 3, and the second control module 3, based on the movement signal and the sound signal, can determine that the sound signal is a barking sound made by the target dog wearing the dog training and bark control device 100, and thus analyze the sound signal. the barking sound emitted by the dog wearing the dog training anti-bark device 100, thereby analyzing the barking signal. This is to prevent the barking of other dogs from being captured and analyzed by the sound sensing unit 88 in the dog training anti-bark device 100, which affects the authenticity of the number of barking sounds of the target dog as well as the barking status data, and improves the accuracy of the monitoring data of the target dog.

In one embodiment, the dog training and bark control device 100 further includes a physiological parameter sensing unit 1001 electrically connected to the second control module 3. The physiological parameter sensing unit 1001 may be a temperature sensor, a heart rate sensor, an acceleration sensor and the like. The physiological parameter sensing unit 1001 detects a physiological parameter of the target dog, and the physiological parameter includes at least one of a temperature, a heart rate, a blood pressure, a sleep time, a number of steps of exercise, and energy consumed by exercise. The second control module 3 is also used to feedback at least one of the body temperature, heart rate, blood pressure, sleep time, number of exercise steps, and energy consumed by the exercise of the target dog to the user via the second communication module 1005, i.e., to be transmitted to the remote controller 50 or the cloud (storage), etc., via the second communication module 1005, so as to enable the user to detect the health condition of the target dog. In the case of an abnormality in the data in the health condition of the target dog, the user may take timely medical treatment for the target dog, thus avoiding accidents of the target dog.

In one embodiment, the dog training and bark control device 100 further includes a first temperature sensor 1002 electrically connected to the second control module 3. The first temperature sensor 1002 is used for detecting the body temperature of the target dog, so that the user knows the body temperature of the target dog, in order to intervene in a timely manner in case of an abnormality in the body temperature of the target dog. Together with the alarm module 1007, the second control module 3 may alarm the user via the alarm module 1007 when the temperature fed back by the first temperature sensor 1002 exceeds a preset temperature based on the temperature of the target dog when the body temperature of the target dog is abnormal, so as to alert the user.

In one embodiment, the dog training and bark control device 100 further includes a second temperature sensor 1003 electrically connected to the second control module 3. The second temperature sensor 1003 is used to detect an ambient temperature. The second control module 3 is used to receive the ambient temperature detected by the second temperature sensor 1003 and to transmit the ambient temperature to the remote controller 50 via the second communication module 1005. In this way, the user monitors the temperature of the environment in which the target dog is located to avoid the ambient temperature being too high.

In one embodiment, the dog training and bark control device 100 further includes a distance sensing unit 1004 electrically connected to the second control module 3. The distance sensing unit 1004 is used to detect position information of the dog training and bark control device 100. The second control module 3 is used to receive the position information detected by the distance sensing unit 1004 and feedback the position information to the remote controller 50 via the second communication module 1005 so that the user knows the position of the target dog.

In one embodiment, the dog training and bark control device 100 further includes a distance sensing unit 1004 electrically connected to the second control module 3. The distance sensing unit 1004 is used to detect a distance between the dog training and bark control device 100 and the remote controller 50. The second control module 3 is used to send a reminder signal to the remote controller 50 when the distance information fed back by the distance sensing unit 1004 exceeds a preset distance. In this way, the user monitors whether the target dog is in the specified area, and the user can react to prevent the target dog from going far away when the target dog goes beyond the preset distance. In this way, it can also be in the search for the target dog, and play an auxiliary role in searching for the target dog.

Specifically, the distance sensing unit 1004 may be a positioning module, a GPS module, a Beidou positioning module, and the like.

In one embodiment, the dog training and bark control device 100 further includes a first operation button 1008 electrically connected to the second control module 3. The second control module 3 also collects a first audio data of the user and stores it through the sound sensing unit 8 when the user operates the first operation button 1008. The first control module 5002 also sends an interactive control signal through the first communication module 5001. The second control module 3 receives the interactive control signal via the second communication module 1005 to retrieve the first audio data and play the first audio data through the audio playback module 1006. Utilizing a pre-recorded sound on the second control module 3, it is convenient for the user to directly send the interactive control signal directly through the remote controller 50 can directly send the interactive control signal, and the second control module 3 plays the recorded first audio data through the audio playback module 1006, which is convenient for the user to interact with the target dog or for the purpose of training the dog.

In one embodiment, the first audio data includes a plurality of groups first audio data. Each group of first audio data is a different audio, and the interactive control signal includes a plurality of groups, and each interactive control signal is corresponding to a group of first audio data. When the user outputs the first interactive control signal via the remote controller 50, the second control module 3 plays the audio data corresponding to the first interactive control signal via the audio playback module 1006. For example, if the audio data corresponding to the first interactive control signal is "sit down", then the audio playback module 1006 plays the sound "sit down". The user outputs a second interactive control signal via the remote controller 50, assuming that the audio data corresponding to the second interactive control signal is "New Year's greeting", then the audio playback module 1006 plays the sound of "New Year's greeting". The interactive control signal and the first audio data are not limited herein.

In one embodiment, the remote controller 50 further includes a second operation button 5004 electrically connected to the first control module 5002, and a third operation button 5005 electrically connected to the first control module 5002. The first control module 5002 collects the second audio data of the user through the sound acquisition module 5003 when the user operates the second operation button 5004, and stores the second audio data of the user. The first control module 5002 retrieves the second audio data of the user through the sound acquisition module 5003, and sends the second audio data via the first communication module 5001. The second control module 3 receives the second audio data via the second communication module 1005 and plays the second audio data through the audio playback module 1006. Using the pre-recorded sound on the first control module 5002, the user can directly send audio to the dog training and bark control device 100 via the remote controller 50, and the second control module 3 receives the audio via the second communication module 1005 and plays the audio via the audio playback module 1006. The dog training and bark control device can also realize the user's interaction with the target dog or the purpose of training the dog without the need of collecting sound by using the sound acquisition module 5003 to collect sound when interacting with the target dog, so that the user can quickly interact with the target dog.

Specifically, in one embodiment, the second audio data includes a plurality of groups of second audio data, the number of the third operation buttons 5005 is a plurality of groups. Each of the third operation buttons 5005 corresponds to a group of the second audio data, so as to allow the user to store the plurality of groups of the second audio data in advance.

In the above embodiment, the sound acquisition module 5003, the sound sensing unit 8 may be a microphone. The audio playback module 1006 may be a speaker. The sound acquisition button 5006, the first operation button 1008, the second operation button 5004, and the third operation button 5005 may be a touch switch, a dial switch, a pressing type switch, and the like.

In this embodiment, the dog training and bark control device 100 further includes a first housing 10, a first display module 20, a first battery 30, and a first circuit board 40. The first display module 20 is installed on the first housing 10. The first battery 30 and the first circuit board 40 are set in the first housing 10 and electrically connected to each other. The second control module 3 is set on the first circuit board 40 and electrically connected to the first display module 20. The first display module 20 is used for displaying an electric quantity of the first battery 30, a charging state of the first battery 30, a first icon 201 representing the dog training mode, a second icon 202 representing the bark control mode, and a third icon 203 representing the dog training and bark control mode. There are no special restrictions on the icon style corresponding to the first icon 201, the second icon 202, and the third icon 203. Through the above structure, analyzing the barking state can help the user monitor the health state of the dog, strengthen interaction between the user and the pet, and improve user experience. And due to the preset barking template, an effective way is provided for the second control module 3 to recognize and understand the sound signal of the target dog, thereby more effectively monitoring the pet's emotions and health state.

Furthermore, a first groove 101 is provided on an outer side surface of the first housing 10, and a first window 102 is provided on the first groove 101, and the first window is in communication with an interior of the first housing. The display module is provided inside the first housing 10 and at least partially placed inside the first window 102. The first display module 20 includes a first lens 210 placed inside the first groove 101 and pasted on a bottom surface of the first groove 101 with waterproof adhesive, and a second circuit board 220, a light guide plate 230, and a pattern substrate 240 placed inside the first housing 10. The light guide plate 230 is at least partially placed inside the first window 102. The pattern substrate 240 is pasted on a side of the light guide plate 230 near the first groove 101, and the second circuit board 220 is located on a side of the light guide plate 230 away from the first groove 101. The pattern substrate 240 is equipped with a light transmitting pattern 250 for transmitting light. The light guide plate 230 is provided with a through hole 260 at a corresponding position of the light transmitting pattern 250. The second circuit board 220 is equipped with a light source component 270 at a corresponding position of the through hole 260. A light from the light source component 270 passes through the through hole 260 and the light transmitting pattern 250 in sequence, and then the light transmitting pattern 250 is projected out from the first lens 210.

Specifically, the first lens 210 can be an LED display screen. The light transmitting pattern 250 includes a digital pattern 251 in a shape of an "8" for displaying a sound gear, a vibration icon 252 for displaying a vibration gear, and an electric shock icon 253 for displaying an electric shock gear. Through the above structure, the dog training and bark control device 100 effectively display a clear and accurate mode, making it easy for a customer to observe and use the dog training and bark control device to train or soothe the dog.

In this embodiment, the first housing 10 is also equipped with a transformer 103, a motor 104, an antenna 105, and a horn 106. The first housing 10 includes a first upper housing 110 and a first lower housing 120, and a waterproof ring 111 is also provided between the first upper housing 110 and the first lower housing 120. The first housing 10 is also equipped with a power button 401 connected to the first circuit board 40 and a first "M" button 402. The power button 401 is used for turning on or turning off the dog training and bark control device 100, and the first "M" button 402 is used for switching modes.

In this embodiment, the remote controller 50 further includes a second housing 51, a second display module 52, a second battery 53, and a third circuit board 54. The second display module 52 is installed on the second housing 51. The second battery 53 and the third circuit board 54 are arranged in the second housing 51 and electrically connected to each other. The second control module 3 is arranged on the second battery 54 and electrically connected to the second display module 52. The second display module 52 is used for displaying an electric quantity of the second battery 53, a charging state of the second battery 53, a fourth icon 521 representing the dog training mode, a fifth icon 522 representing the bark control mode, and a sixth icon 523 representing the dog training and bark control mode. There are no special restrictions on an icon style of the fourth icon 521, the fifth icon 522, and the sixth icon 523.

Furthermore, a second groove 511 is provided on an outer side surface of the second housing 51, and a second window 512 being in communication with an inside of the second housing 51 is provided on the second groove 511. The display module is located inside the second housing 51 and at least partially placed inside the second window 512. The second display module 52 includes a second lens 512 placed inside the second groove 511 and pasted on a bottom surface of the second groove 511 with waterproof adhesive, a display screen 513 and a backlight plate 514 arranged inside the second housing 51. The second lens 516, the display screen 513 and the backlight plate 514 are arranged from top to bottom in sequence. A light from the backlight plate 514 projects a pattern out from the second lens 516 through the display screen 513. Specifically, the display screen 513 is an LCD display screen. Through the above structure, the remote controller 50 effectively display a clear and accurate mode, making it easy for a customer to observe and use the dog training and bark control device to train or soothe the dog.

In this embodiment, the second housing 51 is further equipped with a backlight board cotton 517, a counterweight block 518, and an antenna 519. Furthermore, the remote controller 50 further includes a plurality of functional buttons. Both an upper side and a lower side of the second battery 54 are equipped with functional buttons. The second housing 51 is equipped with pressing members at a corresponding position of the functional buttons. One end of the pressing members abuts against the functional buttons, and the other end extends out of an outer side surface of the second housing 51. The pressing members are silicone pressing members.

Specifically, the functional buttons include a sound control button 501, a vibration control button 502, an electric shock control button 503 arranged on a top surface of the remote controller 50, an upper adjustment button 504 and a lower adjustment button 505 arranged on a right side surface, a second "M" button 506 arranged on a left side surface for mode switching, a push button 507 for locking by pushing and an indicator light 508 arranged at a bottom of the remote controller 50.

In this embodiment, when the dog training and bark control system is set to the dog training mode, by short pressing/long pressing the sound control button 501, the indicator light 508 will remain on in green, the horn of the dog training and bark control device 100 will emit a "beep" sound, and a light of the "8" shaped digital pattern 251 will be always on. By short pressing/long pressing the vibration control button 502, the indicator light 508 will be always on in green, the vibration motor 104 will start working, and a light of the vibration icon 252 will be always on. By short pressing/long pressing the electric shock control button 503, the indicator light 508 will be always on in red at this time, and the electric shock icon 253 will be always lit on.

When the dog training and bark control system is switched to the bark control mode, short pressing the second "M" button 506 can switch to the bark control mode. At this time, the second display module 52 of the remote controller 50 only displays an icon and an electric quantity, and cannot adjust a sensitivity level. At this time, the dog training and bark control device 100 can automatically detect dog barking and trigger operation. There are two triggering modes, namely sound and vibration; or sound and vibration and electric shock.

When the dog training and bark control system is set to the dog training mode and bark control mode, in a no command and standby state of the remote controller 50, the dog training and bark control device 100 automatically detects sound and triggers operation, and executes a preset working mode.

In this embodiment, pairing steps between the remote controller 50 and the dog training and bark control device 100 are as follows.

In step 1, the first "M" button 402 on the dog training and bark control device 100 is long pressed, and after 2 seconds, there will be a "beep" sound representing an entering of a pending pairing state. At this time, a "fourth icon 521" on the dog training and bark control device 100 will flash.

In step 2, the vibration control button 502 of the remote controller 50 is short pressed to transmit a function signal. The dog training and bark control device 100 will give back a "beep" sound twice, indicating successful pairing. Note: after successful pairing, the dog training and bark control device 100 will light up the "fourth icon 521".

In this embodiment, when the remote controller 50 is in a charging state, the indicator light 508 flashes in green during normal charging, the indicator light 508 is always on in green when fully charged, and the indicator light 508 flashes in red alarm rapidly during high-voltage charging. When the dog training and bark control device 100 is in a charging state, a light of a battery icon flashes during normal charging, a light of the icon is always on when fully charged, and the horn makes a "beep beep beep" alarm sound during high-voltage charging.

In this embodiment, if the remote controller 50 is not operated within a first preset time value, the remote controller 50 will enter a sleep state, and a current of the remote controller 50 in the sleep state or a shutdown state is lower than a first preset current value. The dog training and bark control device 100 will enter the sleep state if it is not triggered or not operated within a second preset time value. The current of the dog training and bark control device 100 in the sleep state or the shutdown state is lower than a second preset current value. Specifically, the remote controller 50 enters the sleep state after 30 seconds of no operation. When the remote controller 50 is in the sleep state or the shutdown state, the current is less than 20 UA. When the dog training and bark control device 100 enters the sleep state after 15 seconds of no triggering or no operation, the "8" shaped digital pattern 251 flashes a light every 4 seconds. The current of the dog training and bark control device 100 in the sleep state or the shutdown state is less than 0.3 MA. The above structure helps to reduce power consumption, protect a battery, and extend a service life.

In other embodiments, the remote controller 50 may also be a mobile terminal, such as a cell phone, a tablet computer, and other devices.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A dog training and bark control system comprising:
a dog training and bark control device; and
a remote controller;
wherein the remote controller comprises a first control module, a sound acquisition module, and a first communication module; both the sound acquisition module and the first communication module are electrically connected to the first control module, the sound acquisition module is used for acquiring sound data; the first control module is used for receiving the sound data acquired by the sound acquisition module and wirelessly transmitting the sound data through the first communication module;
and the first control module is configured for sending a first control signal through the first communication module;
wherein the dog training and bark control device comprises a second control module, an audio playback module, a dog training and bark control module, and a second communication module; the audio playback module, the dog training and bark control module, and the second communication module are electrically connected to the second control module; the second communication module communicates with the first communication module; the second control module is configured for receiving sound data sent by the first communication module through the second communication module, and configured for playing the sound data through the audio playback module; the second control module is also configured for receiving the sound data sent by the first communication module through the second communication module, the second control module is also configured for receiving a first control signal sent by the first communication module through the second communication module, and for controlling the dog training and bark control module to provide a first dog training stimulus to a dog;
wherein the dog training and bark control device further comprises a sound sensing unit electrically connected to the second control module, the sound sensing unit being used to collect sound signals from a target dog;
wherein the second control module is configured for receiving the sound signal of the dog collected by the sound sensing unit, and analyzing number of times of barks of the target dog within a preset time range and/or analyzing a barking state of the target dog based on the sound signal in order to obtain state data of the target dog, and for feeding back of the state data to the user;
wherein the second control module is configured for analyzing a number of times the target dog barks within the preset time range, and determining whether the number of times the barks is within the preset number of times within the preset time range; and, if not, the second control module obtains abnormal status data as the status data of the target dog, then feeds the abnormal status data back to the user.

2. The dog training and bark control system according to claim 1, wherein the preset time range is greater than or equal to one day.

3. The dog training and bark control system according to claim 1, wherein the second control module is preset with a barking template; the second control module is configured for matching the sound signal with the barking template, and when the second control module judges the sound signal to be a barking state corresponding to the barking template, then obtaining a preset barking state corresponding to the barking template as the status data and feeding the status data back to the user; the barking template comprising a template representing at least one of the states of fear, hunger, alertness, anger, aggrieved, sadness, sickness, and excitement.

4. The dog training and bark control system according to claim 1, wherein the dog training and bark control device further comprises an alarm module, the alarm module being electrically connected to the second control module; the second control module is further used to feed back to the user in the event that the number of barking sounds as well as the barking state are abnormal and drive the alarm module to alarm.

5. The dog training and bark control system according to claim 4, wherein the alarm module is at least one of a sound alarm module, a vibration alarm module, and a light alarm module.

6. The dog training and bark control system according to claim 1, wherein the dog training and bark control device further comprises a physiological parameter sensing unit electrically connected to the second control module, the physiological parameter sensing unit being used to detect a physiological parameter of the target dog, the physiological parameter comprising at least one of a body temperature, a heart rate, a blood pressure, a sleep time, a number of steps of exercise, and an energy consumption of exercise.

7. The dog training and bark control system according to claim 6, wherein the second control module is further used to obtain the physiological parameters of the target dog via the physiological parameter sensing unit and transmit the physiological parameters to the remote controller via the second communication module.

8. The dog training and bark control system according to claim 1, wherein the dog training and bark control device further comprises a first temperature sensor electrically connected to the second control module, the first temperature sensor being used for detecting the body temperature of the target dog.

9. The dog training and bark control system according to claim 1, wherein the dog training and bark control device further comprises a second temperature sensor electrically connected to the second control module, the second temperature sensor being used for detecting an ambient temperature, and the second control module being used for receiving the ambient temperature detected by the second temperature sensor and transmitting the ambient temperature to the remote controller via the second communication module.

10. The dog training and bark control system according to claim 1, wherein the dog training and bark control device further comprises a distance sensing unit electrically connected to the second control module, the distance sensing unit being used for detecting position information of the dog training and bark control device; the second control module being used for receiving the position information detected by the distance sensing unit and transmitting the position information back to the remote controller via the second communication module.

11. The dog training and bark control system according to claim 1, wherein the dog training and bark control device further comprises a distance sensing unit electrically connected to the second control module, the distance sensing unit being used for detecting a distance between the dog training and bark control device and the remote controller; the second control module being used for receiving the distance information fed back from the distance sensing unit and sending a reminder signal to the remote controller when the distance information exceeds a predetermined distance.

12. The dog training and bark control system according to claim 1, wherein the dog training and bark control device further comprises a first operation button electrically connected to the second control module, the second control module also collects a first audio data of the user through the sound sensing unit when the user operates the first operation button and stores the first audio data, the first control module also sends an interactive control signal through the first communication module, the second control module receives an interactive control signal using the second communication module, retrieves the first audio data and plays the first audio data through an audio player.

13. The dog training and stopping barking assembly according to claim 12, wherein the first audio data comprises a plurality sets of first audio data, the interactive control signal comprises a plurality sets of control signals, and each interactive control signal corresponds to a set of first audio data.

14. The dog training and bark control system according to claim 1, wherein the remote controller further comprises a second operation button and a third operation button electrically connected to the first control module, the first control module capturing a second audio data of the user through a sound acquisition module when the user operates the second operation button and storing the second audio data, and the first control module further captures the user's second audio data by retrieving the second audio data when the user operates the third operation button and sending the second audio data through the first communication module; the second control module receives the second audio data using the second communication module and plays the second audio data through an audio player.

15. The dog training and bark control system according to claim 14, wherein the second audio data comprises a plurality sets of second audio data, a total number of the third operation buttons is plural, and each of the third operation buttons corresponds to a set of the second audio data.

16. A dog training and bark control system comprising:
a dog training and bark control device; and
a remote controller;
wherein the remote controller comprises a first control module, a sound acquisition module, and a first communication module; both the sound acquisition module and the first communication module are electrically connected to the first control module, the sound acquisition module is used for acquiring sound data; the first control module is used for receiving the sound data acquired by the sound acquisition module and wirelessly transmitting the sound data through the first communication module; and the first control module is configured for sending a first control signal through the first communication module;
wherein the dog training and bark control device comprises a second control module, an audio playback module, a dog training and bark control module, and a second communication module; the audio playback module, the dog training and bark control module, and the second communication module are electrically connected to the second control module; the second communication module communicates with the first communication module; the second control module is configured for receiving sound data sent by the first communication module through the second communication module, and configured for playing the sound data through the audio playback module; the second control module is also configured for receiving the sound data sent by the first communication module through the second communication module, the second control module is also configured for receiving a first control signal sent by the first communication module through the second communication module, and for controlling the dog training and bark control module to provide a first dog training stimulus to a dog;
wherein the dog training and bark control device further comprises a sound sensing unit electrically connected to the second control module, the sound sensing unit being used to collect sound signals from a target dog; the second control module is configured for receiving the sound signal of the dog collected by the sound sensing unit, and analyzing number of times of barks of the target dog within a preset time range and/or analyzing a barking state of the target dog based on the sound signal in order to obtain state data of the target dog, and for feeding back of the state data to the user;
wherein the dog training and bark control device further comprises a vibration sensing unit, the vibration sensing unit being used to detect and obtain a motion signal of the target dog; the second control module, being further used to receive the sound signal and the motion signal of the target dog, and to judge whether the sound signal is a sound signal of the target dog based on the motion signal of the target dog; if a judgement result is "yes", the second control module is used for analyzing the sound signal.

17. A dog training and bark control system comprising:
a dog training and bark control device; and
a remote controller;
wherein the remote controller comprises a first control module, a sound acquisition module, and a first communication module; both the sound acquisition module and the first communication module are electrically connected to the first control module, the sound acquisition module is used for acquiring sound data; the first control module is used for receiving the sound data acquired by the sound acquisition module and wirelessly transmitting the sound data through the first communication module; and the first control module is configured for sending a first control signal through the first communication module;
wherein the dog training and bark control device comprises a second control module, an audio playback module, a dog training and bark control module, and a second communication module; the audio playback module, the dog training and bark control module, and the second communication module are electrically connected to the second control module; the second communication module communicates with the first communication module; the second control module is configured for receiving sound data sent by the first communication module through the second communication module, and configured for playing the sound data through the audio playback module; the second control module is also configured for receiving the sound data sent by the first communication module through the second communication module, the second control module is also configured for receiving a first control signal sent by the first communication module through the second communication module, and for controlling the dog training and bark control module to provide a first dog training stimulus to a dog; wherein the dog training and bark control device further comprises a sensing module electrically connected to the second control module and used for detecting barking of a dog for obtaining a detection signal, the dog training and bark control device having a dog training mode, a bark control mode and a dog training and bark control mode;
in the dog training mode, the second control module passes a first control signal in order to control the stop bark training module to provide a first dog training stimulus to the dog;
in the bark control mode, the second control module for controlling the dog training stop-bark module to provide a first bark control stimulus to a dog based on the detected signal;
in the dog training and bark control mode, the second control module for receiving a second control signal from the remote controller via the first communication module for controlling the dog training and bark control module to provide a second dog training stimulus to the dog, and for controlling the dog training and bark control module to provide a second bark control stimulus to the dog in accordance with the detected signal.

18. The dog training and bark control system according to claim 17, wherein the dog training and bark control module comprises a sound unit for dog training and bark control, an electrical stimulus unit for dog training and bark control, a vibration unit for dog training and bark control, and an ultrasonic unit for dog training and bark control; at least one of the first bark control stimulus, the second bark control stimulus, the first dog training stimulus, and the second dog training stimulus has a first level and a second level; wherein at the first level, at least one of the first bark control stimulus, the second bark control stimulus, the first dog training stimulus and the second dog training stimulus comprises a sound stimulus and a vibration stimulus; wherein at the second level, at least one of the first bark control stimulus, the second bark control stimulus, the first dog training stimulus and the second dog training stimulus comprises a sound stimulus, a vibration stimulus, and an electrical stimulus.

* * * * *